_United States Patent Office_

3,476,831
Patented Nov. 4, 1969

3,476,831
PRODUCTION OF UNSATURATED ISOBUTYLENE GRAFT COPOLYMERS
Guenther Daumiller, Ziegelhausen, Ernst-Guenther Kastning, Assenheim, and Herbert Naarmann, Ludwigshafen (Rhine), Germany, assignors to Badische Anilin- & Soda-Fabrik Aktiengesellschaft, Ludwigshafen (Rhine), Germany
No Drawing. Filed Apr. 28, 1966, Ser. No. 545,886
Claims priority, application Germany, May 8, 1965, B 81,827; June 26, 1965, B 82,572
Int. Cl. C08d 1/30; C08f 1/72
U.S. Cl. 260—879    5 Claims

ABSTRACT OF THE DISCLOSURE

Process for the production of unsaturated isobutylene graft copolymers, in which isobutylene is grafted onto diene polymers containing halogen atoms, using Lewis acids as catalysts. The copolymers can be vulcanized without difficulty because of their relatively high content of double bonds. The vulcanizates have high tensile strengths and require the use of only minor amounts of stabilizer.

---

The present invention relates to a process for the production of unsaturated isobutylene graft copolymers in which isobutylene is grafted onto polymers of dienes.

It is already known that isobutylene may be copolymerized with dienes, e.g. isoprene, 2,3-dimethylbutadiene and butadiene. The proportion of copolymerized diene units in the copolymers is however a maximum of only 5% by weight in all cases. All attempts and measures to increase the proportion of copolymerized diene units in the copolymers have hitherto been without success. Because of the small content of unsaturated groups which originate from the diene units the polymers have very poor vulcanization behavior (vulcanization temperatures of 150° to 200° C. are required as compared with the 100° to 140° C. conventionally used with diene rubbers) and consequently the vulcanizates also have unsatisfactory properties.

Since the prior art isobutylene diene copolymers containing unsaturated groups cannot be used alone as rubbers because of their unsatisfactory vulcanizability, attempts have been made to mix them with other diene rubbers. In this case, too, satisfactory results are not obtained because prior art unsaturated isobutylene diene copolymers have only poor compatibility with other diene rubbers.

The object of the present invention is the production of unsaturated isobutylene copolymers having good vulcanizability.

We have found that the said object can be achieved, namely that isobutylene can be grafted onto diene polymers while obtaining unsaturated isobutylene graft copolymers having a high proportion of vulcanizable unsaturated groups by polymerizing (a) 5 to 95% by weight of isobutylene with (b) 95 to 5% by weight of diene polymers having molecular weights of 125 to 5,000,000 and containing 1 to 0.000001 halogen atom per monomer unit, the sum of the percentages given under (a) and (b) being 100% by weight, in the presence of 0.000001 to 5% by weight on the total weight of components (a) and (b) of a Lewis acid at —150° C. to —30° C. and pressures of from 1 to 10 atmospheres.

The present invention therefore relates to a process for the production of unsaturated isobutylene graft copolymers in which isobutylene is grafted into diene polymers and whose characteristic feature is that 5 to 95% by weight of isobutylene is polymerized with 95 to 5% by weight of diene polymers having molecular weights of 125 to 5,000,000 and containing 1 to 0.000001 halogen atom per monomer unit, in the presence of 0.000001 to 5% by weight of Lewis acids at —150° C. to —30° C. and pressures of from 1 to 10 atmospheres.

By the process according to this invention, isobutylene is thus polymerized with diene polymers which contain a relatively large number of unsaturated groups. The diene polymers contain halogen and the polyisobutylene side chains are grafted on at the points where the halogen is situated in the diene polymers.

The Lewis acids are preferably derived from elements of Groups III to VI of the Periodic System. Examples of suitable Lewis acids are boron trifluoride, boron trifluoride diethyl etherate, gallium tribromide, titanium tetrachloride, tin tetrachloride, vanadium tetrachloride, vanadium oxychloride, tantalum pentachloride, niobium pentachloride, phosphorus trichloride, phosphorus oxychloride, arsenic trichloride, antimony pentachloride, molybdenum pentachloride and iron trichloride. They probably form with the halogen-containing diene polymers a complex compound which acts as a polymerization initiator for the isobutylene. Other suitable Lewis acids are aluminum compounds having the general formula $AlR^1R^2R^3$ in which $R^1$, $R^2$ and $R^3$ denote saturated aliphatic radicals having one to four carbon atoms, or halogen atoms. Examples of such compounds are: aluminum trifluoride, aluminum trichloride, aluminum tribromide, aluminum triiodide, triisobutylaluminum and diethylaluminum monochloride. These compounds, too, presumably form with the halogen-containing diene polymers a complex compound which acts as a polymerization initiator for isobutylene.

Examples of suitable halogen-containing diene polymers having molecular weights of from 125 to 5,000,000 are those obtained by homopolymerization or copolymerization of dienes, with or without copolymerizable compounds which are not dienes, and into which halogen has been subsequently introduced. In the same way diene homopolymers and copolymers are also suitable which contain polymerized units of monomers containing halogen, for example homopolymers and copolymers of chloroprene, 1-chloropropene and/or 2-chloropropene and/or copolymers of butadiene and/or isoprene with halogen-containing monomers, such as chloroprene, cis-1-chloropropene, trans-1-chloropropene and allyl chloride. The halogen-containing diene polymers must have molecular weights of from 125 to 5,000,000, preferably of 1,500 to 500,000 and must contain 1 to 0.000001, preferably 0.02 to 0.0001 halogen atom per monomer unit. Chlorine and bromine are preferred as the halogen but in principle diene polymers containing fluorine atoms or iodine atoms are also suitable.

The Lewis acids or mixtures of Lewis acids are added in amounts of 0.000001 to 5, preferably 0.0001 to 0.05% by weight to the polymerization mixture. The Lewis acids form with the halogen-containing diene polymers the polymerization initiator for the isobutylene. The molecular weight of the graft polymers may be controlled by the amount of Lewis acid added. The molecular weight and the number of graft sites are also regulated by the halogen content of the diene polymer, or in other words a diene polymer which contains a large amount of halogen (with reference to the monomer units) offers a large number of sites for the grafting reaction, whereas a diene polymer which contains only a small amount of halogen has correspondingly fewer graft sites.

Production of the isobutylene copolymers may be carried out in the presence or absence of diluents. It is self-evident that water and aqueous solvents should be excluded when carrying out polymerization, as well as alcohols, amines, acids or other compounds which have reactive hydrogen atoms and which can therefore intervene in the polymerization in a regulating manner. Aliphatic, cycloaliphatic or aromatic hydrocarbons, such as ethane, ethylene, propane, propylene, butanes, pentanes, hexanes, heptanes, octanes, alkylated cyclohexanes, benzenes, toluene, ethylbenzene, xylenes or mixtures of these substances with one another are particularly suitable diluents.

To prepare the isobutylene copolymers, the halogen-containing diene polymer may be placed in a reactor and isobutylene (if desired dissolved in a solvent, for example liquid ethylene) together with the Lewis acid are added thereto. It is also possible to place isobutylene alone or in a suitable solvent in a reactor and to add thereto the halogen-containing diene polymer and the Lewis acid, and it may be advantageous to allow the Lewis acid to first of all react with the halogen-containing polymer with the formation of a complex, so that separate addition of the Lewis acid is dispensed with. The molecular weight can be regulated by the polymerization temperature and, as already mentioned, by the amount of Lewis acid. The lower the polymerization temperature is, the higher is the molecular weight obtained.

Isobutylene graft copolymers containing double bonds prepared by the process according to this invention consist of a polymer chain which contains the double bonds and onto which isobutylene is grafted. The degree of unsaturation is thus dependent on the ratio of the amount of grafted-on isobutylene to the amount of diene polymer containing double bonds. The graft copolymers have a tough consistency. They are practically colorless and usually soluble without gel formation in a large number of solvents. The catalyst constituents stemming from the Lewis acids may be hydrolyzed in a conventional way with water or alcohol and washed out from the copolymer for example with alkaline reagents.

Graft copolymers according to this invention can be vulcanized very well because of their relatively high content of double bonds. They may be vulcanized in the conventional way with the addition of conventional vulcanization assistants, such as mercaptothiazoline, mercaptobenzothiazole and its derivatives, dithiocarbamates, thiurams, dithiomethanes and xanthates, and in vulcanized form, if desired after the addition of fillers, such as particularly carbon black, titanium dioxide and/or diatomaceous earth, may be used as vulcanized rubber for many purposes. The vulcanizates have tensile strengths of 150 to 250 kg./sq. cm. according to DIN 51,304.

The new rubbers in general require particularly small amounts of stabilizers. Whereas it is necessary to stabilize conventional rubbers based on polybutadiene or copolymers of butadiene with styrene or acrylonitrile against the influence of light, oxygen and heat with about 1.0 to 2.5% by weight of stabilizer, about 0.1% by weight of conventional stabilizers is adequate in the case of copolymers according to the present invention. The amount of stabilizers is mainly dependent on the percentage of diene polymer contained in the graft polymer; for example a graft polymer containing 80% of isobutylene units requires only about one-fifth of the amount of stabilizer which a conventional diene rubber requires.

The invention is illustrated by the following examples in which the parts are by weight. The K values given in the examples (unless otherwise stated) have been determined in 0.5% toluene solution according to H. Fikentscher, "Cellulosechemie," 13, 58 (1932).

EXAMPLE 1

100 parts of a 20% toluene solution of a complex compound which has been prepared by adding 1 part of titanium tetrachloride to 19 parts of a polybutadiene oil having a K value of 20.2 (5% in benzene; molecular weight between 500 and 50,000) and containing 0.9% by weight of bromine is added to 230 parts of oily isobutylene at −80° C. in a stirred vessel.

The temperature is kept at −80° C. for three hours; after neutralization with sodium bicarbonate and precipitation from methanol, 80 parts of a copolymer is obtained which has a K-value of 68.5 and which contains about 20% by weight of polybutadiene units.

EXAMPLE 2

Polymerization is carried out as in Example 1 but at temperatures of from −90° C. to −100° C. 90.5 parts of a copolymer is obtained which has a K value of 87. When polymerization is carried out at −40° C. to −50° C., 93 parts of a copolymer is obtained having a K value of 43.

EXAMPLE 3

(a) 4.5 parts of tin tetrachloride and 90 parts of toluene are added in a stirred vessel to 10 parts of a copolymer of butadiene and 2-chloropropene which has a K value of 82 (0.5% in a mixture of equal parts of toluene and dichlorobenzene; molecular weight accordingly between 125 and 5,000,000) and contains 5% by weight of 2-chloropropene units. The whole is cooled to −90° C., 250 parts of isobutylene is added and the reaction temperature is kept at −90° C. for three hours.

The product is neutralized with sodium bicarbonate and precipitated from methanol; 94 parts of isobutylene copolymer is obtained having a K value of 87 and containing about 10% by weight of unsaturated fraction.

(b) The procedure under (a) is followed, but only 100 parts of isobutylene is added, the conditions being otherwise the same. 60 parts of copolymer having a K value of 89 is obtained which contains an unsaturated fraction of about 16% by weight.

(c) The procedure under (a) is followed but only 55 parts of isobutylene is added, the conditions otherwise being the same. 46 parts of copolymer is obtained which contains about 20% by weight of unsaturated fraction.

(d) The procedure under (a) is followed but only 30 parts of isobutylene is added, the conditions being otherwise the same, 21 parts of copolymer is obtained which contains about 40% by weight of unsaturated fraction.

EXAMPLE 4

The procedure of Example 3(a) is followed, but 3 parts of vanadium tetrabromide is used instead of the tin tetrachloride. 65 parts of isobutylene copolymer is obtained having a K value of 80.5 and containing about 15% by weight of polymerized unsaturated units.

EXAMPLE 5

The procedure of Example 3(a) is followed, but 8 parts of molybdenum pentachloride is used instead of the tin tetrachloride. 79 parts of isobutylene copolymer having a K value of 88.5 is obtained which contains about 13% by weight of polymerized unsaturated units.

EXAMPLE 6

(a) 5 parts of vanadium oxychloride and 90 parts of toluene are added in a stirred vessel to 10 parts of a copolymer of isoprene and 2-chloropropene which has a K value of 61 (0.5% in a mixture of equal parts of toluene and dichlorobenzene; molecular weight accordingly between 125 and 5,000,000) and contains 4.6 parts of polymerized 2-chloroprene units.

The whole is cooled to −90° C., 250 parts of isobutylene is added and polymerization is carried on for three hours at −90° C. 80 parts of isobutylene copolymer having a K value of 79.5 is obtained which contains about 12% by weight of unsaturated fraction.

(b) The procedure of (a) is followed, but a petroleum ether fraction having a boiling point range of 35° C. to 50° C. is used instead of toluene. 62 parts of an isobutylene copolymer having a K value of 64 is obtained which contains about 15% by weight of unsaturated fraction.

(c) The procedure of (a) is followed, but liquid ethylene is used as solvent instead of toluene, 81 parts of isobutylene copolymer having a K value of 84 is obtained which contains 12.5% by weight of unsaturated fraction.

EXAMPLE 7

(a) 200 parts of isobutylene is added at −90° C. in a stirred vessel to a mixture of 10 parts of polychloroprene having a K value of 103 (0.1% in a mixture of equal parts of toluene and dichlorobenzene; molecular weight accordingly between 125 and 5,000,000), 0.5 part of gallium tribromide and 90 parts of toluene. Polymerization is carried on for five hours at −90° C. and then neutralization is effected with sodium carbonate and precipitation from methanol. 65 parts of isobutylene copolymer is obtained which has a K value of 66 and an unsaturated fraction of about 16% by weight.

(b) The procedure of (a) is followed, but 5 parts of gallium trichloride is used instead of gallium tribromide, the conditions being otherwise the same. 69 parts of isobutylene copolymer having a K value of 74 is obtained which has an unsaturated fraction of about 15% by weight.

(c) The procedure of (a) is followed, but 25 parts of gallium trichloride is used instead of gallium tribromide, the conditions otherwise being the same. 81 parts of isobutylene copolymer having a K value of 43 is obtained in admixture with about 10 parts of a low molecular weight polyisobutylene having a K value of 18.

(d) The procedure of (a) is followed, but 25 parts of tin tetrachloride is used instead of gallium tribromide, the conditions being otherwise the same. 92 parts of insoluble isobutylene copolymer is obtained with which practically no isobutylene homopolymer is mixed.

EXAMPLE 8

(a) 20 parts of a complex compound which has been prepared by reacting 18 parts of a chlorinated polybutadiene oil having a chlorine content of 0.8% by weight and a molecular weight of about 3,500 with 2 parts of niobium pentachloride with an addition of 100 parts of toluene is added to 200 parts of liquid isobutylene at −90° to −100° C. The reaction mixture is then kept at −90° C. for ten hours, neutralized and precipitated from methanol. 73 parts of isobutylene copolymer is obtained which contains about 27% of unsaturated fraction and has a value of 74.

(b) The procedure of (a) is followed, but a complex compound is used which has been obtained from 35 parts of a polyisoprene (K value 94; molecular weight accordingly between 125 and 5,000,000; bromine content of 0.9% by weight), 1 part of aluminum trichloride and 0.5 part of titanium tetrachloride. 122 parts of an isobutylene copolymer is obtained which has a K value of 92 and contains about 28.5% by weight of polydiene fraction.

(c) The procedure of (a) is followed, but a complex compound is used which has been obtained from 10 parts of a polybutadiene (K value 98; molecular weight accordingly between 125 and 5,000,000; iodine content 0.6% by weight; 1,4-cis content 94%) and 1.3 parts of titanium tetrachloride. 46 parts of an isobutylene copolymer is obtained having a K value of 86 and containing about 21.5% by weight of polydiene fraction.

(d) The procedure of (a) is followed, but a complex compound is used which has been obtained from 45 parts of a polybutadiene (K value 90.5; molecular weight accordingly between 125 and 5,000,000; bromine content 1.3% by weight; 1,2-cis content 96%) and 3.9 parts of molybdenum pentachloride. 114 parts of an isobutylene copolymer is obtained having a K value of 89 and a polydiene fraction of about 39.5% by weight.

(e) The procedure of (a) is followed, but a complex compound is used which has been obtained from 40 parts of a polybutadiene (K value 102; molecular weight accordingly between 125 and 5,000,000; bromine content 0.8% by weight; 1,4-trans content 95%) and 6.1 parts of vanadium tetrachloride. 91 parts of an isobutylene copolymer is obtained having a K value of 82.5 and a polydiene fraction of about 44% by weight.

(f) The procedure of (a) is followed, but a complex compound is used which has been obtained from 70 parts of a polybutadiene (K value 116; molecular weight accordingly between 125 and 5,000,000; bromine content 1% by weight; 1,4-cis content 35%, 1,4-trans content 55%, 1,2-vinyl content 10%), 3.7 parts of boron trifluoride and 1.3 parts of titanium tetrachloride. 138 parts of an isobutylene copolymer is obtained having a K value of 86 and a polydiene fraction of about 50.5% by weight.

(g) The procedure of (a) is followed, but a complex compound is used which has been obtained from 90 parts of polybutadiene (K value 39; molecular weight accordingly between 125 and 5,000,000; bromine content of 3.8% by weight; 1,2-vinyl content 91%) and 10 parts of aluminum tribromide. 106 parts of an isobutylene copolymer is obtained having a K value of 45 and a polydiene fraction of 85% by weight.

(h) The procedure of (a) is followed, but a complex compound is used which has been obtained from 50 parts of a polybutadiene (K value 27; molecular weight accordingly between 125 and 5,000,000; chlorine content 8.5% by weight; 1,4-cis content 93%) and 10 parts of antimony pentachloride. 107 parts of an isobutylene copolymer is obtained which has a K value of 39 and a polydiene fraction of about 46.5% by weight.

(i) The procedure of (a) is followed, but a complex compound is used which has been obtained from 50 parts of a copolymer of butadiene and styrene and having a styrene fraction of 30% by weight (K value 84; molecular weight accordingly between 125 and 5,000,000; chlorine content 1.95% by weight; 1,2-vinyl content 14% by weight), 2 parts of ferric chloride and 1.5 parts of boron trifluoride. 112 parts of an isobutylene copolymer is obtained having a K value of 74 and a polydiene fraction of 44.5% by weight.

(j) The procedure of (a) is followed, but a complex compound is used which has been obtained from 50 parts of a copolymer of butadiene and α-methylstyrene having an α-methylstyrene fraction of 10% by weight (K value 73; molecular weight accordingly between 125 and 5,000,000; chlorine content 3.2% by weight), 1.5 parts of tantalum pentachloride and 3 parts of titanium tetrabromide. 129 parts of an isobutylene copoylmer is obtained which has a K value of 71 and a polydiene fraction of about 39% by weight.

EXAMPLE 9

The procedure of Example 8(a) is followed, but a brominated oily copolymer of 90% by weight of butadiene and 10% by weight of α-ethylstyrene having a bromine content of 0.5% by weight is used instead of the polybutadiene oil containing chlorine. 76 parts of an isobutylene copolymer is obtained having a K value of 80.5 and an unsaturated fraction of about 25% by weight.

EXAMPLE 10

An oily block copolymer of 8.5% by weight of α-methylstyrene and 91.5% by weight of butadiene having a K value of 20 (molecular weight accordingly between 125 and 5,000,000) is chlorinated to a chlorine content of 4.8% by weight (iodine number of the product: 409). 20 parts of this product is dissolved in 200 parts of pure n-hexane and the solution has 1 part of titanium tetrachloride added to it. A red brown complex which gives a clear solution when dissolved is formed. 200 parts of pure isobutylene is added to the resultant solution at −76° C. in the course of 40 minutes with intense cooling. The whole is then stirred for a further hour at −70° C. after which aqueous sodium bicarbonate solution is added at room temperature. The polymer obtained is washed with water and precipitated from toluene solution with methanol. 198 parts of an elastomeric graft copolymer having a K value of 46 is obtained. The iodine number of the product is 44 and its chlorine content is 0.3%.

EXAMPLE 11

100 parts of a 20% solution in toluene of a complex compound (prepared by adding 1 part of diethyl aluminum monochloride to 19 parts of a polybutadiene oil containing 0.5% by weight of bromine and having a K value of 19.5 (5% in benzene; molecular weight accordingly between 125 and 5,000,000) is poured into 230 parts of oily isobutylene at −80° C. in a stirred vessel.

The temperature is kept at −80° C. for three hours; neutralization is effected with sodium bicarbonate and the product is precipitated from methanol. 92 parts of a copolymer is obtained which has a K value of 79 and contains about 20% by weight of unsaturated comonomer units.

EXAMPLE 12

(a) The procedure described in Example 11 is followed, but at temperatures between −90° and −100° C. 90.5 parts of a copolymer is obtained which has a K value of 92.

(b) The procedure described in Example 11 is followed but at temperatures between −40° and −50° C. 93 parts of a copolymer is obtained having a K value of 54.

EXAMPLE 13

(a) 5.5 parts of aluminum chloride and 90 parts of toluene are added in a stirred vessel to 10 parts of a copolymer of butadiene and 2-chloropropene which has a K value of 82 (0.5% in a mixture of equal parts of toluene and dichlorobenzene; molecular weight accordingly between 125 and 5,000,000) and which contains 5% by weight of 1-chloropropene units. This mixture is cooled to −90° C. and 200 parts of isobutylene is added; this temperature is maintained for three hours.

Neutralization is effected with sodium bicarbonate and precipitation from methanol. 89 parts of an isobutylene copolymer is obtained which has a K value of 93.5 and contains about 11% by weight of unsaturated fraction.

(b) The procedure of (a) is followed, but only 100 parts of isobutylene is added. After working up 63 parts of a copolymer is obtained which has a K value of 97 and an unsaturated fraction of about 16% by weight.

(c) The procedure of (a) is followed, but only 55 parts of isobutylene is added. After working up 49 parts of a copolymer is obtained which has a K value of 98.5 and an unsaturated fraction of about 20% by weight.

(d) The procedure of (a) is followed, but only 30 parts of isobutylene is added. After working up 23 parts of a copolymer is obtained which has a K value of 101.5 and an unsaturated fraction of about 43% by weight.

EXAMPLE 14

The procedure of Example 13(a) is followed, but 3 parts of aluminum bromide is used instead of aluminum chloride to form the complex compound. 70 parts of an isobutylene copolymer is obtained which has a K value of 84 and contains about 14% by weight of polymerized unsaturated units.

EXAMPLE 15

The procedure of Example 13(a) is followed but 8 parts of triethylaluminum is used to form the complex. 81 parts of an isobutylene copolymer is obtained which has a K value of 86 and contains about 12% by weight of polymerized unsaturated units.

EXAMPLE 16

(a) 5 parts of aluminum chloride and 90 parts of toluene are added in a stirred vessel to 10 parts of a copolymer of isoprene and chloropropene which has a K value of 61 (0.5% in a mixture of equal parts of toluene and dichlorobenzene; molecular weight accordingly between 125 and 5,000,000) and which contains 4.6% by weight of 2-chloropropene units.

This mixture is cooled as described in Example 13, isobutylene is added and the resultant polymer is worked up. 82 parts of an isobutylene copolymer is obtained having a K value of 90.5 and containing about 12% by weight of unsaturated fraction.

(b) The procedure of (a) is followed, but the toluene is replaced by a petroleum ether fraction having a boiling point range of between 35° and 50° C. 65 parts of an isobutylene copolymer is obtained which has a K value of 72. The fraction of unsaturated groups is about 15% by weight.

(c) The procedure of (a) is followed, but toluene is replaced by ethylene. 79 parts of an isobutylene copolymer is obtained having a K value of 101. The fraction of unsaturated groups is about 12.4% by weight.

EXAMPLE 17

(a) 0.5 part of aluminum chloride and 90 parts of toluene are added in a stirred vessel to 10 parts of chloroprene having a K value of 103 (0.1% in a mixture of equal parts of toluene and dichlorobenzene; molecular weight accordingly between 125 and 5,000,000) and containing 37.8% by weight of chlorine. 160 parts of isobutylene is added to this reaction mixture at −90° C. Five hours later neutralization is effected with sodium bicarbonate and the product is precipitated from methanol. 64 parts of an isobutylene copolymer is obtained having a K value of 96 and an unsaturated fraction of about 15.5% by weight.

(b) The procedure of (a) is followed, but 5 parts of aluminum chloride is used in the production of the complex compound. 67 parts of an isobutylene copolymer is obtained having a K value of 99.5. The unsaturated fraction is about 15% by weight.

(c) The procedure of (a) is followed, but 25 parts of aluminum chloride is used in the production of the complex compound. 78.5 parts of an isobutylene copolymer is obtained having a K value of 81 as well as about 12 parts of a low molecular weight polyisobutylene having a K value of 23.

(d) The procedure of (c) is followed, but 25 parts of diethylaluminum monochloride is used in the production of the complex compound. 89 parts of an isobutylene copolymer is exclusively obtained which has a K value of 93 and which is not contaminated by oligomeric polyisobutylene.

EXAMPLE 18

20 parts of a complex compound which has been prepared by reacting 18 parts of a chlorinated polybutadiene oil having 0.8% by weight of chlorine and a molecular weight of about 3500 to 5000 with 2 parts of aluminum chloride with an addition of 100 parts of toluene, is added to 200 parts of liquid isobutylene at −90° to −100° C. After the reactants have been brought together, the reaction mixture is kept at −90° C. for four hours and then neutralized and precipitated from methanol. 75 parts of an isobutylene copolymer is obtained which contains about 26% by weight of unsaturated fraction and has a K value of 89.

EXAMPLE 19

The procedure of Example 18 is followed, but the polybutadiene oil used contains 0.5% by weight of bromine and as a comonomer 10% by weight of α-methylstyrene. 78 parts of an isobutylene copolymer is obtained which contains about 25% by weight of unsaturated fraction and has a K value of 90.5.

We claim:
1. A process for the production of unsaturated isobutylene graft copolymers in which isobutylene is grafted onto diene polymers, wherein 5 to 95% by weight of isobutylene is polymerized with 95 to 5% by weight of diene homopolymers or copolymers with other dienes having molecular weights of from 125 to 5,000,000 and containing 1 to 0.000001 halogen atom per monomer unit in the presence of 0.000001 to 5% by weight of Lewis acids at $-150°$ C. to $-30°$ C. and at pressures of from 1 to 10 atmospheres.

2. A process as claimed in claim 1 wherein the diene homopolymers or copolymers with other dienes have molecular weights of 1,500 to 500,000.

3. A process as claimed in claim 1 wherein the diene homopolymers or copolymers with other dienes contain 0.02 to 0.0001 halogen atom per monomer unit.

4. A process as claimed in claim 1 wherein the Lewis acids are used in amounts of from 0.0001 to 0.05% by weight.

5. A process as claimed in claim 1 carried out in the presence of a diluent.

References Cited

UNITED STATES PATENTS

| | | | |
|---|---|---|---|
| 2,451,048 | 10/1948 | Sparks et al. | 260—879 XR |
| 2,927,104 | 3/1960 | Small et al. | 260—94.8 |
| 3,123,592 | 3/1964 | Gasparoni et al. | 260—94.8 |

OTHER REFERENCES

"The Chemistry of Cationic Polymerization," edit. by Plesch Pergamon Press Ltd., pp. 606–609 (1963).

Minoura et al.: Jour. Polymer Science, part A–1, vol. 4, No. 7, July 1966, pp. 1665–1681 (only pp. 1665–1667 relied on).

MURRAY TILLMAN, Primary Examiner

JOHN C. BLEUTGE, Assistant Examiner

U.S. Cl. X.R.

260—82.1, 85.3, 85.1, 41.5